(12) United States Patent
Jangbarwala

(10) Patent No.: US 6,776,913 B1
(45) Date of Patent: Aug. 17, 2004

(54) WATER SOFTENING METHOD AND APPARATUS FOR USE THEREWITH

(76) Inventor: Juzer Jangbarwala, 14461 Autumn Hill La., Chino Hills, CA (US) 91709

( * ) Notice: Subject to any disclaimer, the term of this patent is extended or adjusted under 35 U.S.C. 154(b) by 0 days.

(21) Appl. No.: 10/031,824

(22) PCT Filed: Jul. 20, 2000

(86) PCT No.: PCT/US00/19928
§ 371 (c)(1),
(2), (4) Date: Jan. 18, 2002

(87) PCT Pub. No.: WO01/05503
PCT Pub. Date: Jan. 25, 2001

Related U.S. Application Data
(60) Provisional application No. 60/144,637, filed on Jul. 20, 1999.

(51) Int. Cl.[7] .................................................. C02F 1/42
(52) U.S. Cl. ...................... 210/677; 210/687; 210/191; 210/278
(58) Field of Search ................................ 210/670, 677, 210/687, 190, 191, 269, 275, 278

(56) References Cited

U.S. PATENT DOCUMENTS

| | | | |
|---|---|---|---|
| 2,902,155 A | | 9/1959 | Lundeen ..................... 210/190 |
| 3,531,402 A | | 9/1970 | Thompson .................. 210/190 |
| 3,977,968 A | * | 8/1976 | Odland ....................... 210/677 |
| 4,207,397 A | | 6/1980 | Davis et al. ................ 210/677 |
| 5,718,828 A | | 2/1998 | Jangbarwala et al. ....... 210/677 |
| 5,951,874 A | | 9/1999 | Jangbarwala et al. ....... 210/677 |

* cited by examiner

Primary Examiner—Ivars C. Cintins
(74) Attorney, Agent, or Firm—Timothy J. Martin; Michael R. Henson; Rebecca A. Gegick

(57) ABSTRACT

The present invention generally relates to the removal of certain salts, such as those of calcium or magnesium, from water. More particularly, the present invention is directed to a method for efficiently softening water containing certain ions in a manner which limits the volume amount of undesirable waste that is sent to municipality waste treatment systems. Additionally, the present invention includes a water softening apparatus (100) and system (200) useable in small domestic water softeners and existing water and drainage lines.

29 Claims, 12 Drawing Sheets

WATER SOFTENING METHOD AND APPARATUS FOR USE THEREWITH

The present application is a 35 U.S.C. 371 national stage application of international application PCT/US00/19928, filed Jul. 20, 2000, and claims the benefit of U.S. Provisional Application No. 60/144,637, filed Jul. 20, 1999.

FIELD OF THE INVENTION

The present invention generally relates to the removal of certain salts, such as those of calcium or magnesium, from water. More particularly, the present invention is directed to a method for efficiently softening water containing certain ions in a manner which limits the volume amount of undesirable waste that is sent to municipality waste treatment systems. Additionally, the present invention includes a water softening apparatus and system useable in small domestic water softeners and existing water and drainage lines.

BACKGROUND OF THE INVENTION

"Hard" water is water which contains dissolved ions, particularly calcium or magnesium ions. These ions react with soaps, which are sodium salts of stearic acid and similar organic acids, to produce a curdy precipitate of calcium and magnesium salts. When hard water occurs in residential waterlines, residents will note that the dissolved calcium or magnesium ions form a precipitant "scum" with soap, which may be seen in residential areas as a bathtub ring, or as a scum which adheres to clothing. In addition, hard water impedes the formation of a soap lather useful in cleansing processes. Hard water can present a considerable problem in washing, reducing the efficiency of boilers, heating systems, and other apparatus, and in certain industrial process use. Accordingly, it is often desirable to provide a means for removing the unwanted calcium or magnesium salts from the hard water, thereby to provide "soft" water which does not contain such ions. This process is known as "softening" water.

The main cause of hard water is generally dissolved calcium bicarbonate ($Ca(HCO_3)_2$). In limestone or chalk regions, calcium hydrogencarbonate is formed by the action of dissolved carbon dioxide on calcium carbonate. In some areas, hardness also results from dissolved calcium sulfate ($CaSO_4$).

A common method of softening water, such as in small domestic water softeners, involves the process of ion exchange. Ion exchange is a process whereby a water solution is passed through a column of a material that replaces one kind of ion in solution with another kind. Such materials are known as ion exchange resins. Home and commercial water softeners generally contain cation-exchange resins. These resins consist of insoluble macromolecular substances to which negatively charged groups are chemically bonded. The negative charges are counterbalanced by ions such as sodium ions. When hard water containing the calcium or magnesium ion passes through a column of this resin, the sodium ions in the resin are replaced by calcium or magnesium ions. The reaction may be generalized as follows for calcium:

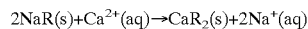

$$2NaR(s) + Ca^{2+}(aq) \rightarrow CaR_2(s) + 2Na^+(aq)$$

where $R^-$ is an anion of the exchange resin. The reaction for magnesium ($Mg^{2+}$) is similar to the reaction for calcium.

Water that has passed through the column containing the ion exchange resin contains sodium ions in place of calcium or magnesium ions, and has been softened. Once the resin has been completely converted to a calcium and/or magnesium salt, it can be regenerated by flushing the column with a concentrated solution of sodium chloride to reverse the previous reaction.

To perform this process in residential and industrial use, water softeners generally consist of a resin vessel filled with softening resin, a riser tube that has a screened opening at the bottom of the resin vessel and that extends through a vessel inlet/valve outlet in the resin vessel, and a multi-port valve that directs the flow of water through different channels to and from the resin vessel. In the service cycle, when water is being softened, the hard water would flow through the multi-port valve and into the resin vessel from the outer diameter of the vessel inlet/valve outlet. The water would then go through the resin bed and become softened. The softened water then flows through the screened opening in the riser tube at the bottom of the resin vessel, through the multi-port valve and to the home water supply.

Once the resin has been completely converted to the calcium or magnesium salt, the resin must be regenerated. During regeneration, most softeners flow brine (which is formed by dissolving common rock salt in water) in the same direction as the service flow, and direct the water from the riser tube through the multi-port valve to a common drain, which is generally connected to a sewer. Some softeners may use a countercurrent flow of brine, but also direct all waste to the drain.

The regeneration process generally includes several steps, including a backwash, brine injection, a slow rinse and a fast rinse. While there may be some slight variations in different water softeners (for example, the sequence of the steps or the direction of flow may be different for some configurations), most water softeners generally utilize the same regeneration principles.

For example, in the backwash step water is directed down through the riser tube and flows upward in the resin vessel. This step lifts the resin bed and directs the waste through the outer diameter opening of the resin vessel, through the multi-port valve and to the drain.

The step of brine injection generally involves opening an inlet valve to an eductor/injector. The eductor/injector is generally a venturi valve. The inlet valve is connected to a brine tank, such as with a flexible tube. Brine in the brine tank is formed by water and rock salt that a user puts in the brine tank periodically. Water is generally provided by a step in the regeneration process which directs water through the multi-port valve to the brine tank. The brine tank generally does not require any agitation, rather it simply saturates by soaking in the salt. The brine injection step includes sending city water at full pressure past the venturi valve, thereby causing a pressure gradient and sucking brine in from the injector to mix with the city water (or water from other water sources, such as well water) used to cause the pressure drop. This mixture is directed through the resin bed, up the riser tube, and out the common drain. The cycle is timed to allow the resin exposure to a specific mass of sodium chloride, which is directly proportional to the capacity desired. Generally, the maximum salt required for achieving maximum resin regeneration capacity is exposed to the resin. After a specific amount of time has elapsed, therefore, the brine inlet valve is closed.

During the slow rinse step, city water (or water from a given water source) continues to be sent through the venturi valve. The venturi valve now acts as a flow control device and sends a slow stream of water to the resin bed, thereby rinsing the salt out. The waste is directed to the city drain.

During the fast rinse step, city water is allowed to flow at full flow through the resin bed and the water is then directed to the city drain. This step packs the resin bed as well as purges any remaining salt out of the resin vessel. During this cycle, most water softeners also open the brine valve and refill the brine tank. A miniature float check valve in the brine tank shuts off flow when the brine tank has reached its capacity.

The multi-port valves for use with such water softeners consist of various types. For example, Autotrol, a division of Osmonics, located in Minnetonka, Minn., uses flapper valves; Fleck Valves, located in Brookfield, Wis., uses a moving piston with openings at different points, and Erie Valves, located in Milwaukee, Wis., uses a revolving disk with openings at different points.

Because self regenerating water softeners send the waste down the home drain to municipality waste treatment systems, excessive salt levels in the water prevent municipalities from reclaiming the waste water for irrigation and other use. There is increasing pressure from these municipalities, accordingly, to ban self regenerating water softeners. For example, some major areas where water is becoming scarce already do not allow these devices. For example, Irvine, San Diego, San Bernardino and Riverside Counties in California do not allow the use of self regenerating home water softeners. Further, as of 1999 there are bills in the California Assembly to ban such devices altogether in California. In other parts of the country where water is scarce, the use of such self regenerating home water softeners may be additionally at risk.

Accordingly, the water softener industry has been aggressively attempting to improve the efficiency of the devices they manufacturer. Devices currently on the market, however, do not reduce the volume of regeneration water enough to economically eliminate discharge to the sewer. Accordingly, it can be seen that there is a need for a new method for softening water with ion exchange which achieves a drastic reduction in waste volume. Further, it can be seen that there remains a need for a new water softener that reduces the waste volume sent to municipality waste treatment systems, and which allows the salt waste to be economically disposed of through alternative disposal routes. The present invention is directed to meeting these needs.

SUMMARY OF THE INVENTION

It is an object of the present invention to provide a new and useful method for reducing the waste volume in domestic and industrial water softeners.

It is another object of the present invention to economically minimize or eliminate discharge of water softener regeneration waste to the sewer.

It is yet another object of the present invention to provide a low cost means for softening water which limits or eliminates the levels of salts sent to municipality waste treatment systems.

A still further object of the present invention is to provide a water softening apparatus which is efficient and economical and which minimizes waste discharge to the city sewer line.

Yet another object of the present invention is to provide a system for softening water which works with the present city water and drainage lines.

Accordingly, the present invention provides a water softening apparatus that is adapted to be placed in fluid communication with a water drain, a processing device, a water source that provides water containing undesired ions, and a water tap that dispenses water for consumption, wherein the water softening apparatus is operative to remove the undesired ions from water processed thereby. The water softening apparatus comprises a resin vessel containing an ion-exchange resin that is capable of chemically shifting between an active state and an exhausted state, a regenerant reservoir adapted to receive a regenerant solution containing selected preferred ions, and a manifold in fluid communication with the resin vessel and the regenerant reservoir.

The manifold has a first inlet in fluid communication with the water source, a first outlet in fluid communication with the water tap, a second outlet in fluid communication with the water drain, and a third outlet in fluid communication with the processing device. The manifold includes a plurality of fluid pathways communicating between the inlet, the outlets, the resin vessel and the regenerant reservoir. A plurality of valves associated with the fluid pathways are configurable into a plurality of valve states. In a first valve state, fluid circulates through the first inlet, through the resin vessel and through the first outlet. In a second valve state, fluid circulates from the regenerant reservoir through the resin vessel and through the second outlet. In a third valve state, fluid circulates from the regenerant reservoir through the resin vessel and through the third outlet. In a fourth valve state, fluid circulates through the first inlet, through the resin vessel and into the regenerant reservoir. In an optional fifth valve state, fluid circulates through the first inlet, through the resin vessel and through the second outlet.

The water softening apparatus may include a pump and a flow controller in fluid communication with the regenerant reservoir and the manifold. The resin vessel may include a first combination inlet/outlet in fluid communication with the first inlet of the manifold and a second combination inlet/outlet in fluid communication with the first outlet of the manifold. The first combination inlet/outlet may also be in fluid communication with the third outlet of the manifold, and the second combination inlet/outlet may also be in fluid communication with the regenerant reservoir. The resin vessel may further include a resin vessel outlet in fluid communication with the second outlet of the manifold. The manifold itself may additionally include a third combination inlet/outlet in fluid communication with the regenerant reservoir.

The manifold is preferably a modified Autotrol Series 169 multi-port valve. The ion-exchange resin may be a shallow shell/shortened diffusion path resin or small bead size resin, and is preferably a Purolite SST or Purolite C100FM resin.

The present invention is also directed to a water softening system that comprises a water softening apparatus according to the present invention, a water source that provides water containing undesired ions such as calcium and magnesium ions, a water tap that dispenses water for consumption, a water drain, and a processing device such as an evaporation device.

The present invention is further directed to a method for softening water that contains undesired ions. The method comprises providing an ion-exchange resin, contacting the ion-exchange resin with the water that contains the undesired ions when the ion-exchange resin is shifted toward its active state, contacting the ion-exchange resin with a regenerant solution containing the selected preferred ions when the ion-exchange resin is shifted toward its exhausted state so as to form a waste solution containing the undesired ions, and collecting the waste solution thereby to permit selective disposal of the undesired ions via a processing device that is separate from a drainage line.

The ion-exchange resin may be provided in a resin vessel that is sized and adapted to receive a selected volume of a fluid. The step of contacting the ion-exchange resin with the regenerant solution may include first contacting the ion-exchange resin with the selected volume of the regenerant solution thereby to displace the selected volume of water from the resin vessel, and passing the selected volume of water to a water drain. The step of contacting the ion-exchange resin with the regenerant solution may include transporting, such as by pumping, the regenerant solution from a regenerant reservoir into the resin vessel, and may include contacting the ion-exchange resin with between 0.25 and 2.0 bed volumes of the regenerant solution. The step of collecting the waste solution may include transporting the waste solution to an evaporation device.

The method may further include the step of rinsing the ion-exchange resin with water thereby to form a rinse solution and thereafter transporting the rinse solution to the regenerant reservoir, and the step of adding rock salt to the regenerant reservoir, thereby to form a brine solution from the rinse solution.

These and other objects of the present invention will become more readily appreciated and understood from a consideration of the following detailed description of the exemplary embodiment of the present invention when taken together with the accompanying drawings, in which:

DETAILED DESCRIPTION OF THE EXEMPLARY EMBODIMENTS

Figure 1:
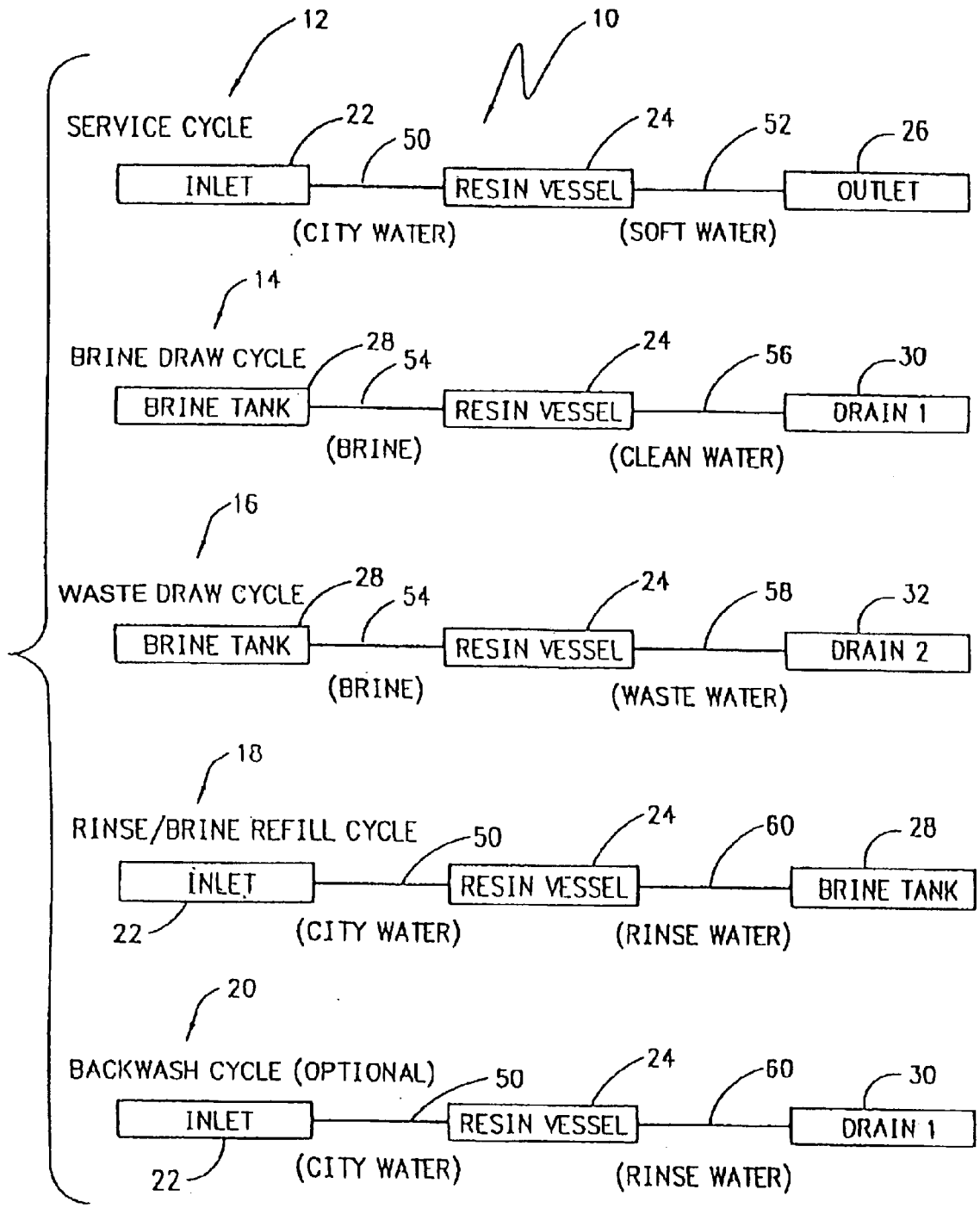
FIG. 1 is a diagrammatic view showing the method steps of the present invention.

The present invention is directed to a method for softening water which limits or reduces the amount of waste sent to municipality water treatment systems, preferably to eliminate any high dissolved solids-bearing waste to such treatment systems. The present invention also is directed to an apparatus for softening water for use with the method of the present invention. In addition, the present invention is directed to a system for softening water for use with the existing water and drainage lines of a home residence or industrial complex. In particular, the present invention utilizes ion exchange resins with very fast kinetics. In addition, the present invention utilizes the flow of specific volumes of solution, which are relative to the bed volume, or liquid equivalent of the volume of resin in the softener. This volume allows the resin to be exposed to a specific mass of sodium chloride which is directly proportional to the maximum rated capacity of the resin. The present invention allows the salt bearing waste to be separated from the non-salt waste, thereby to allow the salt bearing waste to be separately disposed. In addition, the present invention allows the water used to rinse the resin to be additionally used for the formation of brine for use in the next cycle.

The method for softening water includes a service cycle, a brine draw cycle, a waste draw cycle and a rinse/brine refill cycle. The service cycle includes passing city water from an inlet into a resin vessel where ion exchange occurs, and thereafter passing the softened water through an outlet and to the desired water supply. The brine draw cycle includes pumping a specific volume of brine from a brine tank into the resin vessel, thereby to push the clean water that was in the resin vessel through a first drain, which may go to the municipality waste treatment system. The waste draw cycle includes continuing to pump the brine into the vessel thereby to push the solution containing the regeneration waste solution from the ion exchange resin, which contains the contamination and salt that is objectionable to the municipalities, through a second drain that is not directed to the city municipality waste treatment system. The rinse/brine refill cycle sends a specific volume of city water, equal to the volume of brine used, through the inlet, through the resin vessel, and to the brine tank, thereby to rinse the resin vessel as well as refill the brine tank.

Preferably, the regeneration waste solution is sent to an evaporation device, which allows the excess water to be evaporated away thereby to allow the dry salt remaining after water evaporation to be disposed of through the regular garbage disposal routes or other routes. Preferably, the amount of solution directed through the second drain is between 0.25 and 2 bed volumes, which is the liquid equivalent of the volume of resin in the softener.

A backwash cycle may be optionally included to fluff up the resin bed to minimize blockage of the resin by suspended solids in the city water. The backwash cycle includes sending city water through the inlet, into the resin vessel and out the first drain.

It is preferred that resins with very fast kinetics be utilized, such as those which have faster kinetics due to very small bead size or because the ion exchange region is only on the surface of the bead.

The present invention includes a water softening apparatus for use with the method of the present invention. The apparatus includes a resin vessel; a manifold, or multi-port valve; and a regenerant reservoir, or brine tank. The manifold is in fluid communication with an inlet and three outlets. The manifold includes various fluid pathways between the inlet, outlets, the resin vessel and the regenerant reservoir. Valves disposed in the fluid pathways permit configuration of various valve states that allow fluid flow according to the various water softening, regeneration and rinse cycles. The water softening apparatus according to the present invention may further include a pump disposed in fluid communication with the regenerant reservoir and the manifold.

The inlet is preferably in fluid communication with the water source, such as the city water line. The first outlet is preferably in fluid communication with the water tap, such as the faucets, appliances, showers, etc. of a residence or the various devices utilizing water in an industrial plant. Preferably, the second outlet is in fluid communication with the municipality sewer line and the third outlet is in fluid communication with an evaporation device operative to evaporate water from the salt solution.

With reference to FIG. 1, it may be seen that the method of the present invention includes a service cycle 12, a brine draw cycle 14, a waste draw cycle 16 and a rinse/brine refill cycle 18. In addition, the present invention may include a backwash cycle 20. With reference to service cycle 12, it may be seen that city water 50 from a water source is moved from inlet 22 to resin vessel 24 where the hard city water 50 from inlet 22 is softened by ion exchange. It should be understood that water from other sources, such as well water or water internal to an industrial plant, may be used instead of city water, and references herein to "city water" should be understood to encompass water from any selected water source. The resulting soft water 52 is then moved from resin vessel 24 to a first outlet 26 which is in fluid communication with the home or industrial complex water tap. The brine draw cycle 14 includes moving regenerant solution 54, such as brine solution, from the regenerant reservoir 28, or brine tank, to the resin vessel 24. The brine solution contacts an ion exchange resin in the resin vessel and exchanges sodium ions for the metal ions removed from the hard water during the softening process, thereby regenerating the ion exchange resin. It should be understood that appropriate regenerant solutions may be substituted for the brine solution for a given ion-exchange resin. Clean water 56, which contains no or little regenerant wastes, is pushed out of the volume of the resin vessel while brine 54 is being pushed into the resin vessel. This clean water 56 is sent to the second outlet 30, or first drain, whereby the clean water 56 is allowed to be sent to the municipality waste treatment system or other disposal means.

As brine 54 continues to be pushed into resin vessel 24, the waste draw cycle 16 removes the waste water solution 58 resulting from the regeneration of the resin in the resin vessel 24 to a third outlet 32, or second drain. This drain is in fluid communication with an apparatus operative to remove the salt wastes from the waste solution, such as by evaporation, filtration, chemical precipitation or other means.

The rinse/brine refill cycle 18 moves city water 50 from inlet 22 through resin vessel 24 thereby to rinse the resin of any remaining salt. The rinse water 60 is then sent from resin vessel 24 to brine tank 28 where it mixes with rock salt provided by the user thereby to create brine for use in the next cycle.

Backwash cycle 20 may optionally be provided, in addition to the above cycles. Generally, a backwash cycle is not necessary; however, if the water in a particular area is high in suspended solids such a cycle may be desirable. Backwash cycle 20 includes moving city water 50 from inlet 22 through resin vessel 24 in a countercurrent direction and out drain 30 as rinse water 60. This step will fluff up the resin bed, allowing better movement of water through the resin bed during the service cycle so as to minimize blockage by suspended solids in the water.

Figure 2A:
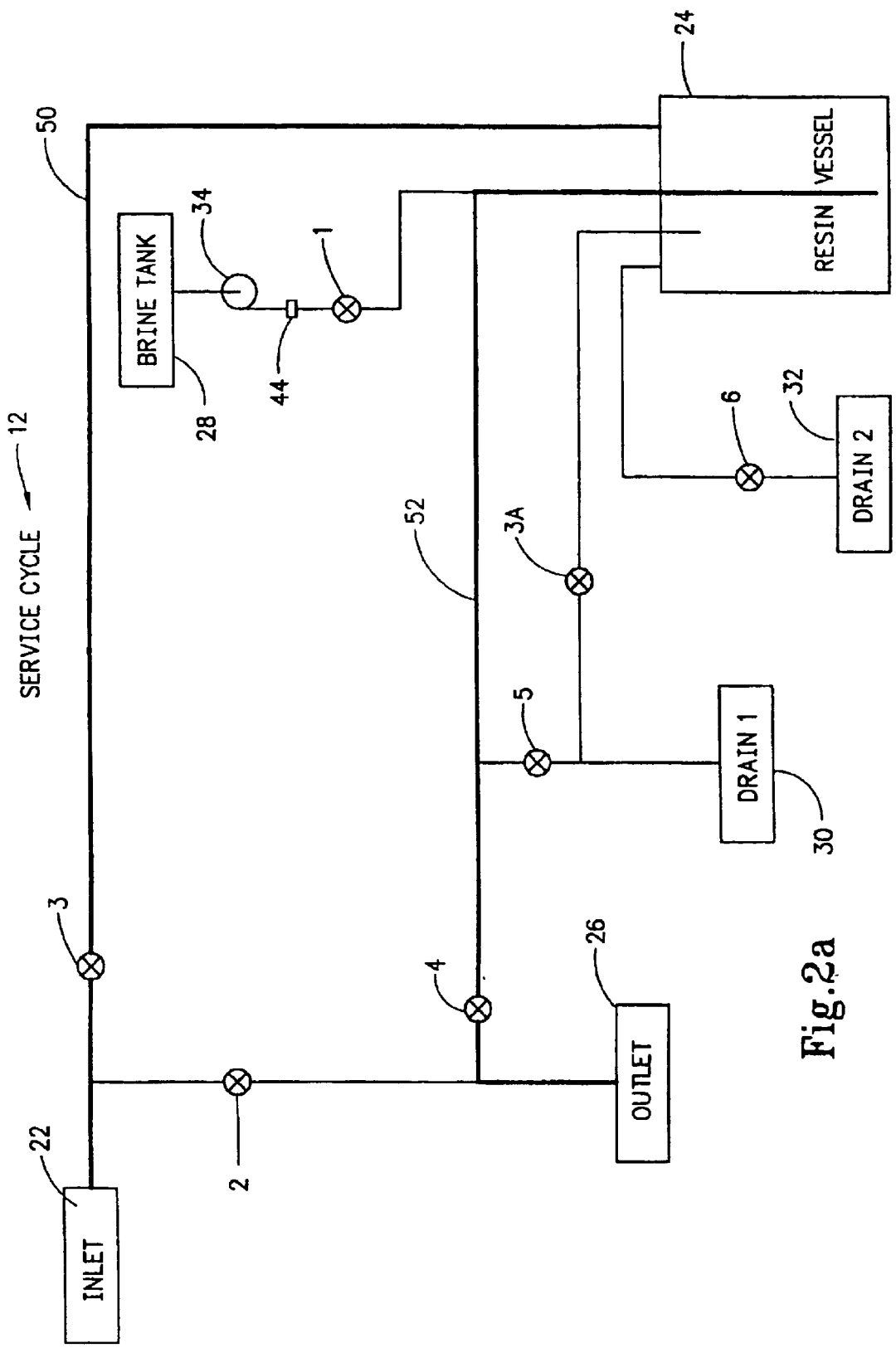
FIG. 2(a) is a diagrammatic view of the service cycle step according to the method of the present invention.

Turning to FIG. 2(a), it may be seen that service cycle 12 includes opening valve 3 to inlet 22 and allowing city water 50 to move into resin vessel 24, as shown by arrows in bold. In addition, valve 4 is opened to allow softened water 52 to be taken from the resin vessel 24 and moved to first outlet 26 and thereon to the home or industry water outlets. Valves 1, 2, 3A, 5 and 6 remain closed.

Figure 3A:
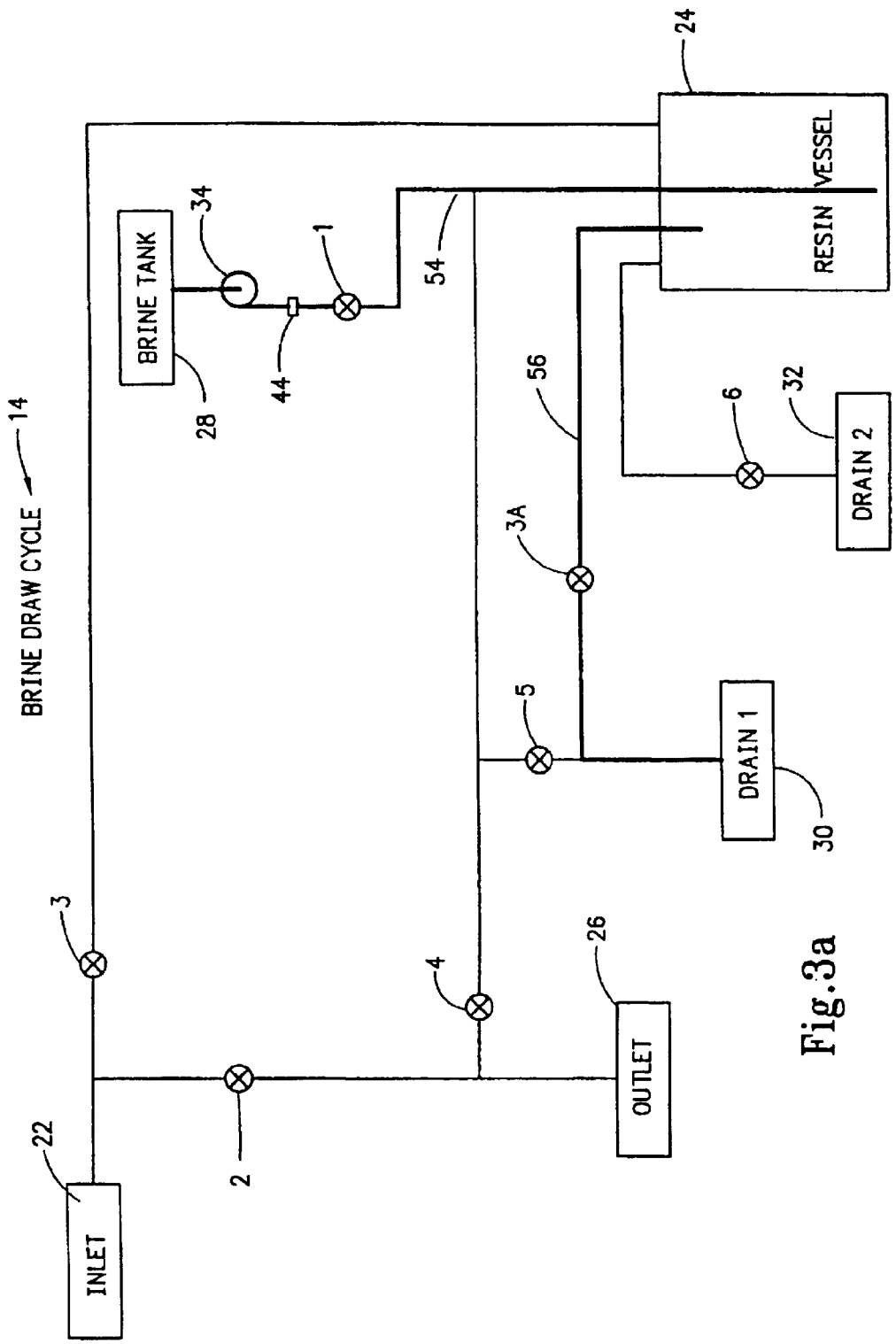
FIG. 3(a) is a diagrammatic view of the brine draw cycle step according to the method of the present invention.

With reference to FIG. 3(a), it may be seen that the brine draw cycle 14 includes pumping brine 54 from brine tank 28 with pump 34 through valve 1 and into resin vessel 24. Pump 34 is turned on by an electric micro switch that is activated as soon as the brine valve flapper opens in valve 1. Pump 34 may be a gear pump, self-priming piston/positive displacement pump, or other pump as known in the art. The flow rate of brine 54 is controlled by flow controller 44, which is preferably an orifice type flow controller as known in the industry. Clean water 56 displaced by brine 54 in resin vessel 24 is moved through valve 3A and out the second outlet, or first drain 30, which preferably connects to a sewer. During the brine draw cycle 14, valves 2, 3, 4, 5 and 6 remain closed.

Figure 4A:
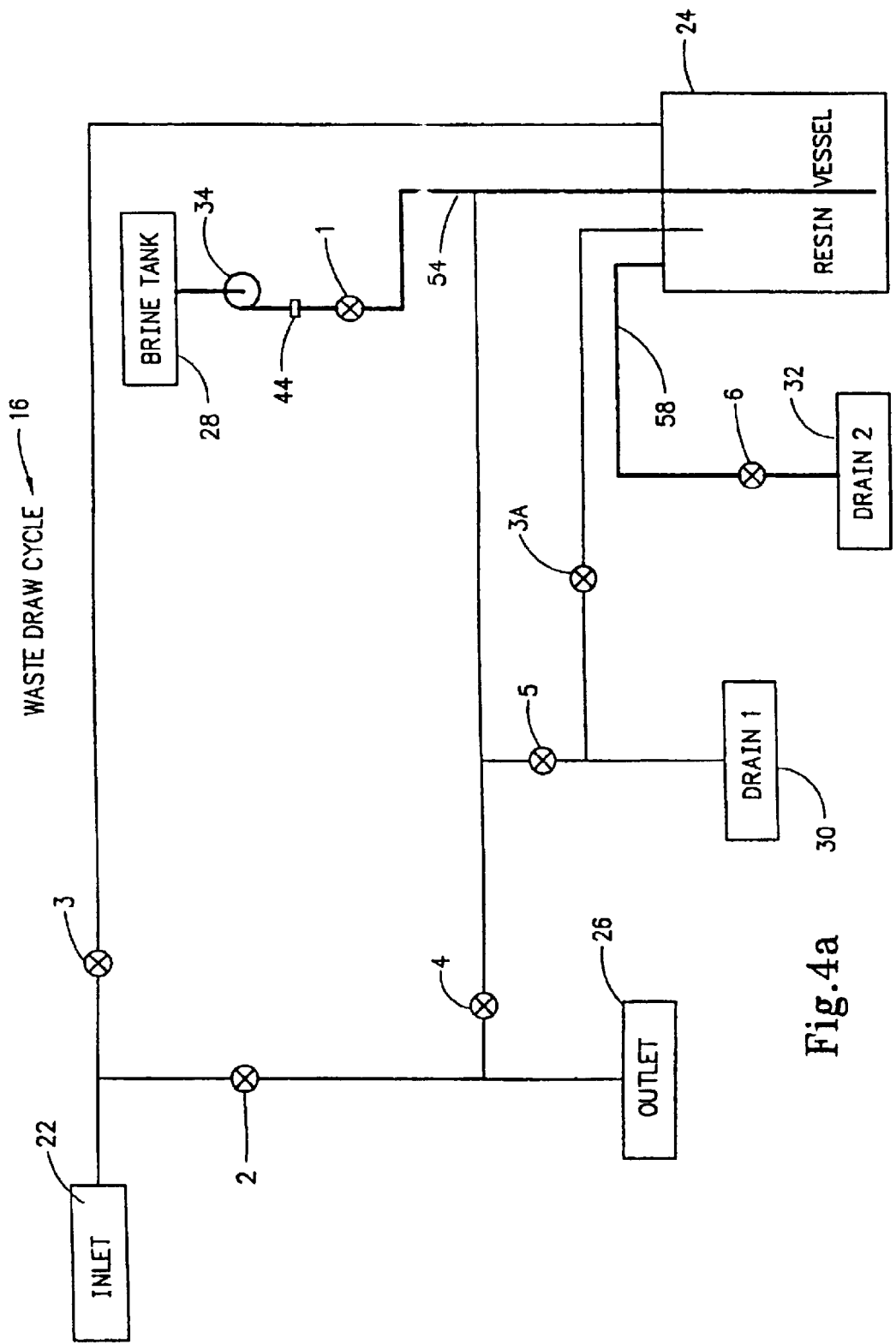
FIG. 4(a) is a diagrammatic view showing the waste draw cycle step according to the method of the present invention.

With reference to FIG. 4(a), it may be seen that once resin vessel 24 has filled with brine 54, the waste draw cycle 16 begins, wherein valve 3A closes and valve 6 opens, while valve 1 remains open and pump 34 continues to pump. At this point, the solution in resin vessel 24 has undergone the ion-exchange process, such that a waste water solution 58 is formed that includes ions such as calcium and magnesium. This volume of solution is moved through valve 6 and out the third outlet, or second drain 32, to a collection, or processing, device operative to dispose of the waste solution 58, preferably an evaporation device. The continued pumping of pump 34 of brine 54 through valve 1 pushes the waste solution 58 through valve 6 and out second drain 32. The volume expelled through valve 6 and out second drain 32 may be from 0.25 to 2.0 bed volumes. A bed volume is the liquid equivalent of the volume of resin in the softener. Valves 2, 3, 3A, 4 and 5 remain closed during this cycle.

Figure 5A:
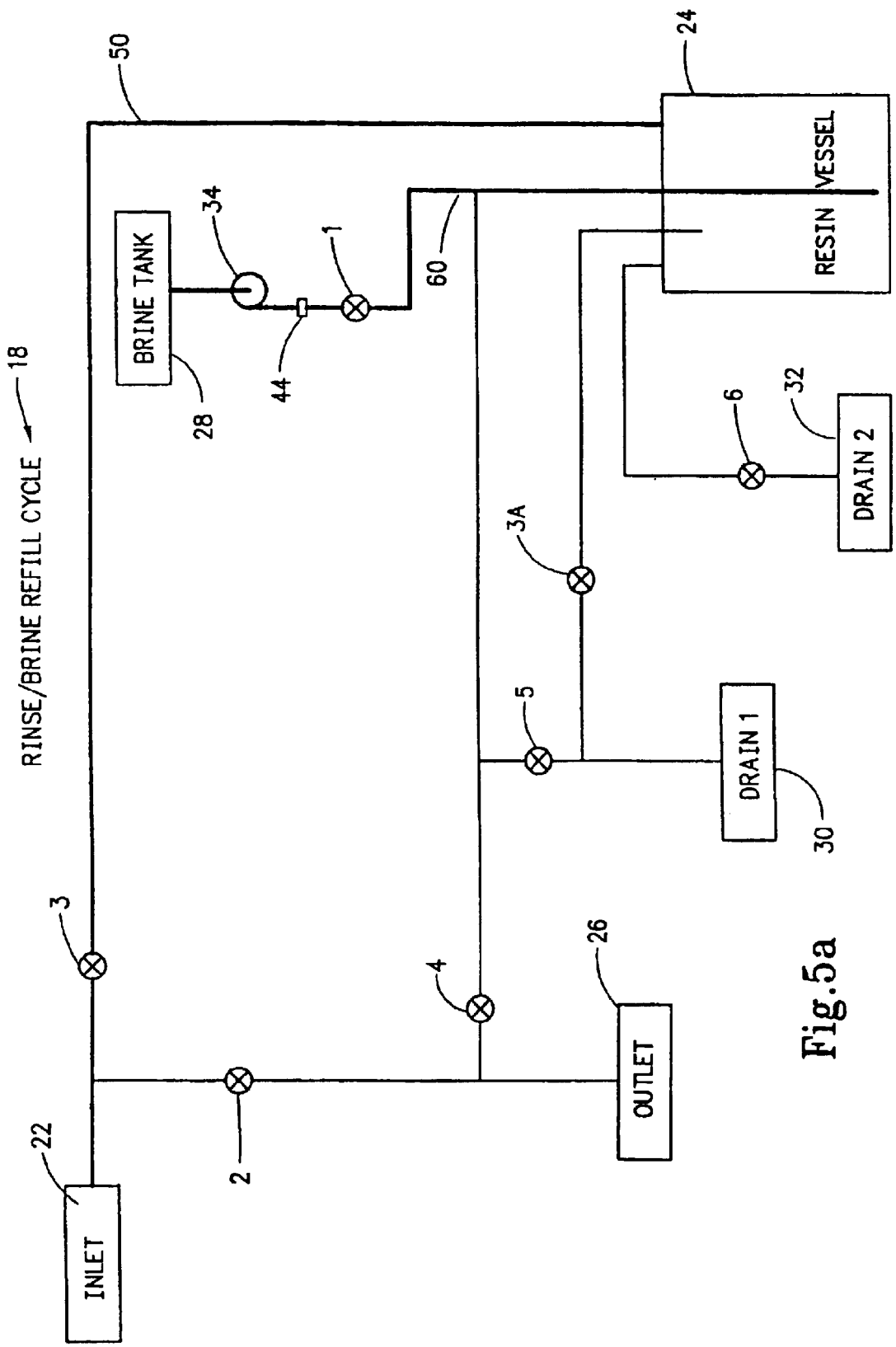
FIG. 5(a) is a diagrammatic view showing the rinse/brine refill cycle step according to the method of the present invention.

With reference to FIG. 5(a), it can be seen that once the waste solution resulting from regeneration of the ion-exchange resin is removed from the resin vessel, the rinse/brine refill cycle 18 begins by opening valves 3 and 1 and closing the remaining valves, thereby to allow city water 50 from inlet 22 to enter resin vessel 24 and move through valve 1 into brine tank 28 as rinse water 60. It should be noted that, while solution is moving through pump 34 in a direction counter to its pumping direction, pump 34 is not active. This step rinses the ion exchange resin 36 in resin vessel 24 as well as refills the solution in brine tank 28.

Figure 6A:
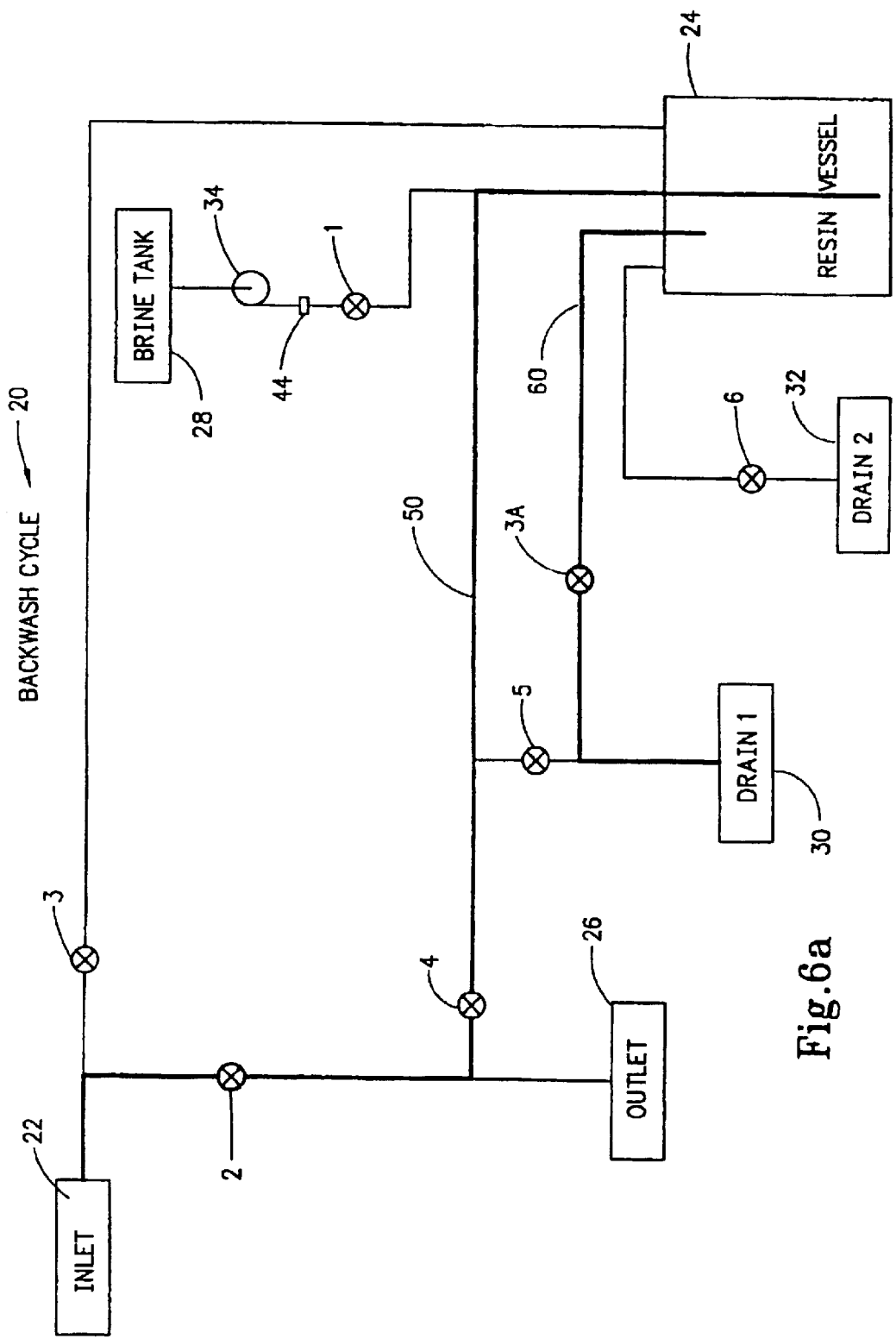
FIG. 6(a) is a diagrammatic view showing the backwash cycle step according to the method of the present invention.

FIG. 6(a) shows a backwash cycle 20 which may optionally be provided. Generally, a backwash cycle is not necessary with the present method; however, a backwash cycle is preferred if the water in a particular area is high in suspended solids. During backwash cycle 20, valves 2, 3A, and 4 are opened, thereby to allow city water 50 through inlet 22 and into resin vessel 24 in a reverse flow direction and out first drain 30 as rinse water 60. This step fluffs up the resin bed thereby to allow better water passage through the resin bed.

Figure 2B:
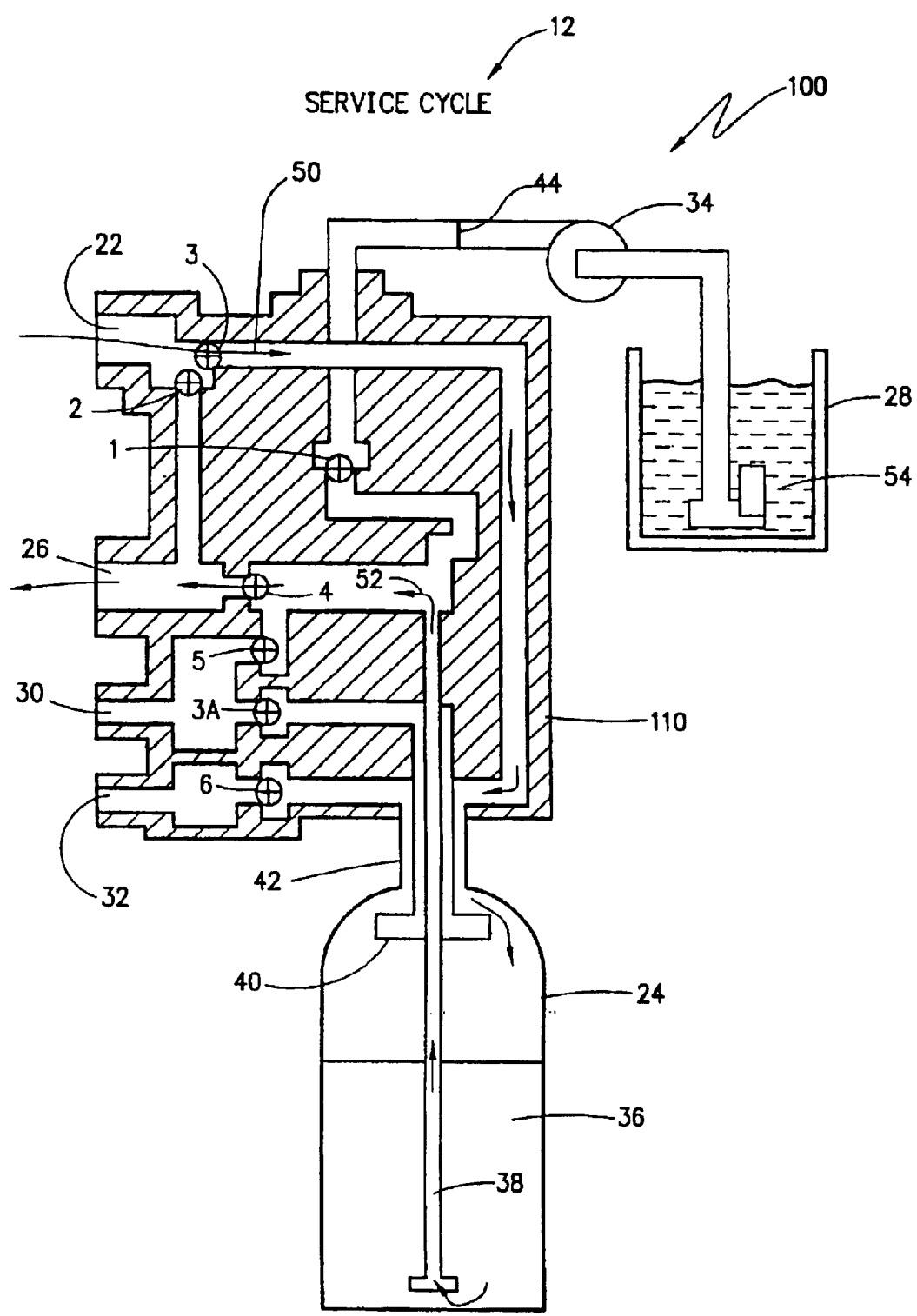
FIG. 2(b) is a diagrammatic view of the water softening apparatus according to the present invention showing the fluid flow direction during the service cycle.

With further reference to FIG. 2(b), it may be seen that water softening apparatus 100 according to the present invention includes a manifold, or multi-port valve 110. The preferred manifold is an Autotrol Series 169 valve, which is manufactured by Autotrol, a division of Osmonics, located in Minnetonka, Minn. The Autotrol 169 valve is preferably slightly modified in accordance with the present invention.

In particular, third outlet, or second drain 32, which is separate from second outlet, or first drain 30, is added to the Autotrol valve, and the venturi valve system of the Autotrol valve is replaced by the pump system described herein.

Manifold 110 is in fluid communication with the regenerant reservoir, or brine tank 28, and resin vessel 24. Pump 34 is in fluid communication between brine tank 28 and manifold 110 and operative to pump brine 54 from brine tank 28 to manifold 110. Manifold 110 includes valves 1, 2, 3, 3A, 4, 5 and 6 as shown.

Ion exchange resin 36 is disposed in resin vessel 24. Resin vessel 24 includes three concentrically disposed conduits, which define various inlets and outlets between resin vessel 24 and manifold 110. In particular, an outer diameter 42 of resin vessel 24 constitutes a first combination inlet/outlet between resin vessel 24 and manifold 110. This combined inlet/outlet may circulate water from inlet 22 into resin vessel 24 when valve 3 is open, and may circulate water to third outlet, or second drain, 32 from resin vessel 24 when valve 6 is open. The innermost concentric conduit, riser tube 38, constitutes a second combination inlet/outlet between manifold 110 and resin vessel 24. In particular, regenerant solution, or brine 54, may be circulated from regenerant reservoir, or brine tank 28, through riser tube 38 into resin vessel 24 when valve 1 is open and pump 34 is active. Water from inlet 22 may be circulated through resin vessel 24, into riser tube 38 and into brine tank 28 when valves 1 and 3 are open and pump 34 is inactive. Outer tube 40 within resin vessel 24 constitutes a resin vessel outlet in fluid communication with second outlet, or first drain 30 of manifold 110.

The fluid communication of brine tank 28 with manifold 110 may be accomplished using a single conduit, as shown, or multiple conduits to the extent understood in the art. In particle, the single conduit fluid communication between brine tank 28 and manifold 110 as shown constitutes a third combination inlet/outlet of manifold 110 itself. That is, fluid can pass either from brine tank 28 to manifold 110 or in the reverse direction from manifold 110 to brine tank 28, depending upon the valve state of the valves in manifold 110 and the state of operation of pump 34.

It is preferred that ion exchange resin 36 be a resin with very fast kinetics. Preferred resins include those manufactured by Purolite, located in Bala Cynwyd, Pa., including the Purolite SST resins and the Purolite C-100-FM. These Purolite resins are classified as "Fine Mesh" resins and have relatively small diameter bead sizes that may range from approximately 16 US mesh to 70 US mesh. The Purolite SST resins, such as the SST-60, have fast kinetics because the ion exchange region is only on the surface of the bead, rather than throughout the sphere of the bead. Such resins are known in the industry as Shallow Shell or Shortened Diffusion Path (SDP) resins. The Purolite C100FM has fast kinetics due to very small bead size. It should be understood that the present invention contemplates the use of ion exchange resins having both standard and very fast kinetics, as well as ion exchange resins which are similar or equivalent to the Purolite versions.

As shown by arrows, during service cycle 12, city water 50 enters inlet 22, passes through open valve 3 and into resin vessel 24 where it contacts ion exchange resin 36. Softened water 52, resulting from the ion exchange reaction of city water 50 with ion exchange resin 36, then flows through riser tube 38 through open valve 4 and out outlet 26 to the home or industrial water supply outlets. Valves 1, 2, 3A, 5 and 6 remain closed.

Figure 3B:
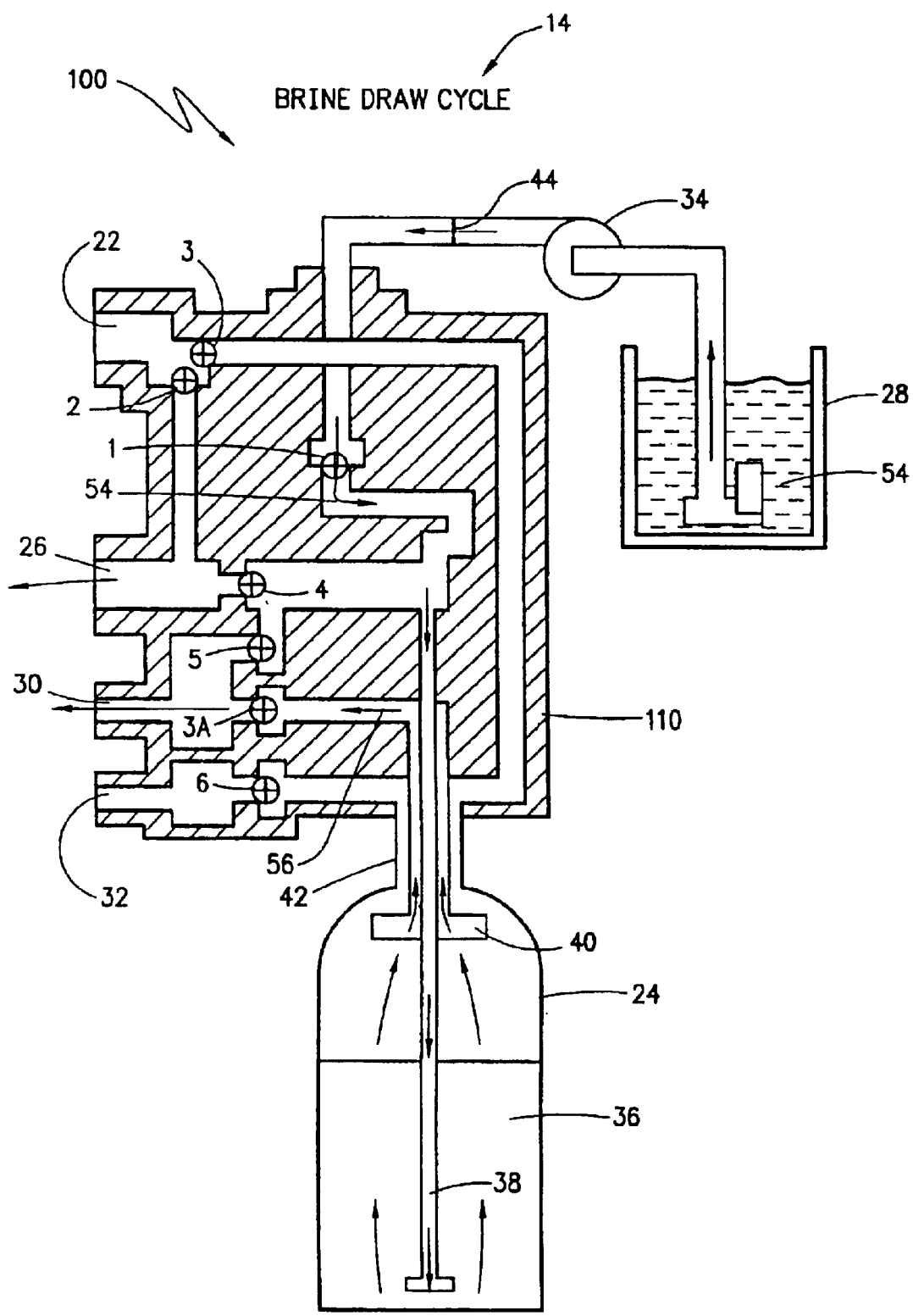
FIG. 3(b) is a diagrammatic view of the apparatus according to the present invention showing the direction of fluid flow during the brine draw cycle.

FIG. 3(b) shows the brine draw cycle 14 during operation of the water softening apparatus 100. Here, brine 54 from brine tank 28 is pumped by pump 34 through open valve 1 into resin vessel 24 through the bottom of the riser tube 38. The flow rate of brine 54 is controlled by flow controller 44, which is preferably an orifice type flow controller known in the art. Clean water 56 displaced by brine 54 enters outer pipe 40 and passes through open valve 3A to drain 30. It is preferred that only an approximate volume of clean water 56 equal to the volume existing in the resin vessel 24 prior to brine 54 entering the resin vessel 24 should be expelled from drain 30, so as to prevent brine 54 from being expelled down drain 30 to the municipality waste treatment system. Valves 2, 3, 4, 5, and 6 remain closed during the brine draw cycle 14.

Figure 4B:
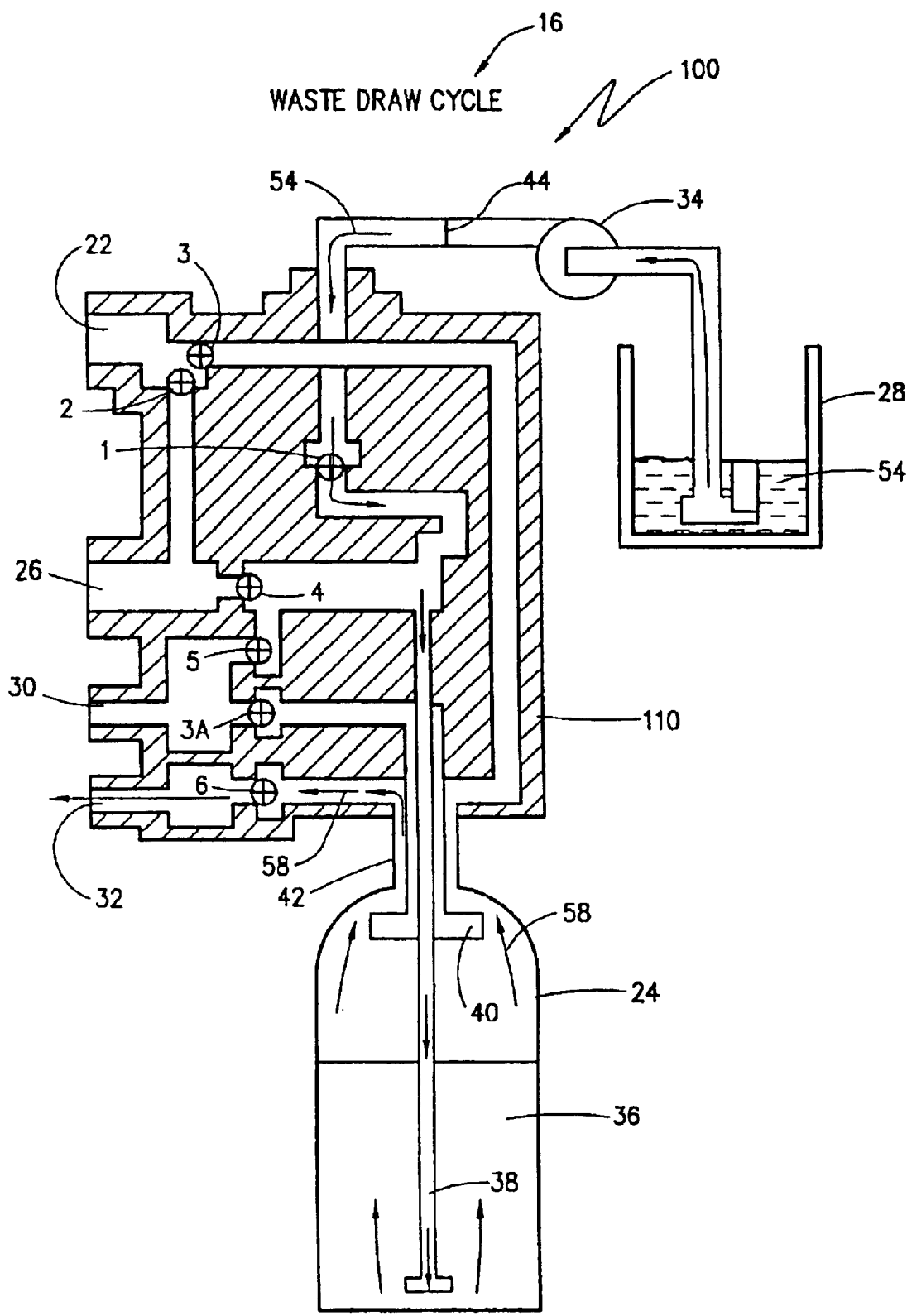
FIG. 4(b) is a diagrammatic view of the apparatus according to the present invention showing the direction of fluid flow during the waste draw cycle.

FIG. 4(b) shows the operation of the waste draw cycle 16 in apparatus 100. The solution in the resin vessel 24 now includes the waste solution 58 from regeneration of ion exchange resin 36 by contact with the brine 54 drawn into resin vessel 24 during the brine draw cycle 14. In the waste draw cycle 16, brine solution 54 continues to be drawn from brine tank 28 by pump 34 through open valve 1 and forced down riser tube 38 into resin vessel 24 and through ion exchange resin 36. This new solution displaces the regenerant waste solution 58, which is moved through the outer diameter 42 of resin vessel 24 through open valve 6 and out second drain 32, to a disposal device such as an evaporation device. Valves 2, 3, 3A, 4 and 5 remain closed.

Figure 5B:
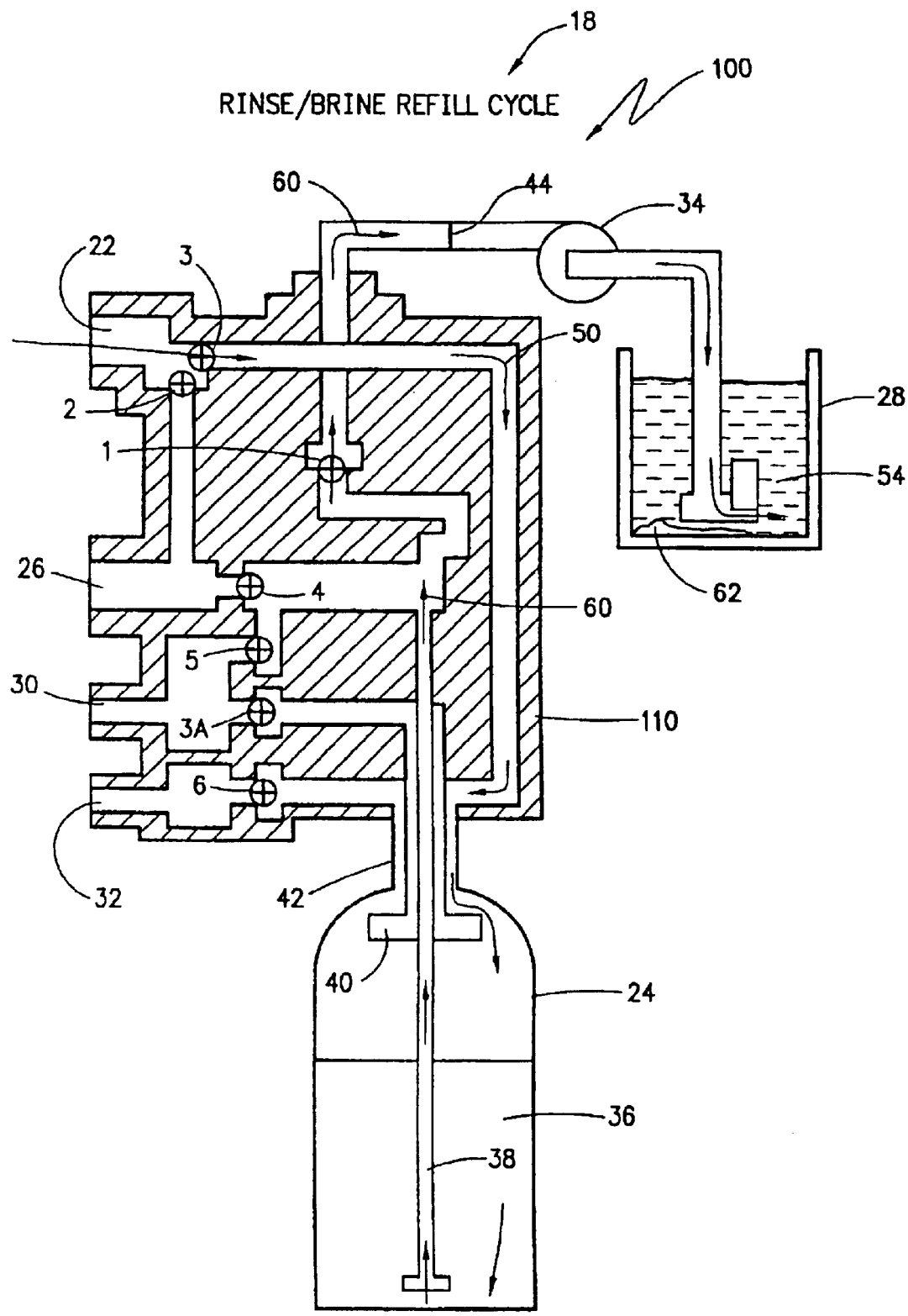
FIG. 5(b) is a diagrammatic view of the apparatus according to the present invention showing the direction of fluid flow during the rinse/brine refill cycle.

FIG. 5(b) shows the rinse/brine refill cycle 18 in apparatus 100. City water 50 from inlet 22 passes through opened valve 3 into resin vessel 24 and through ion exchange resin 36. The rinse solution 60 passes through riser tube 38 and through open valve 1, further through pump 34 which is not active and into brine tank 28. The flow to brine tank 28 is controlled by flow controller 44, such as an orifice type flow controller. When brine tank 28 has reached its capacity, as determined by a time factor relating to the flow rate volume and tank capacity (or other known methods such as a float-check valve), the flapper in valve 1 is closed, thereby to stop the flow of rinse solution 60 to brine tank 28. To replenish the brine concentration in brine tank 28, a user adds rock salt 62 to the solution in brine tank 28. Brine tank 28 does not require agitation, rather the brine solution 54 saturates by soaking in the rock salt 62.

Figure 6B:
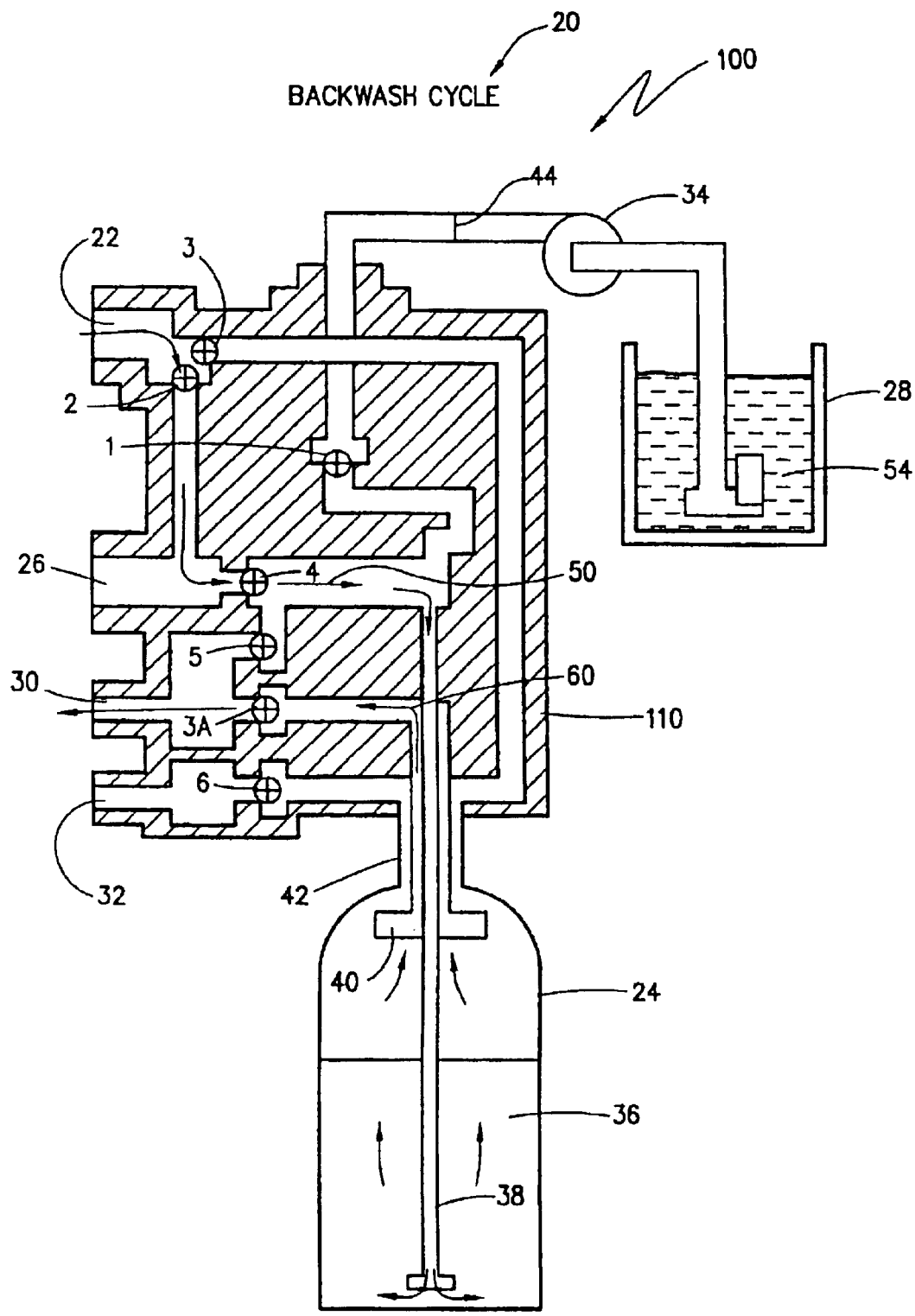
FIG. 6(b) is a diagrammatic view of the apparatus according to the present invention showing the direction of fluid flow during the backwash cycle.

FIG. 6(b) shows the backwash cycle 20 in operation in apparatus 100. Here, city water 50 enters inlet 22 passes through open valves 2 and 4, down riser tube 38 and into resin vessel 24. The rinse water 60 passes through ion exchange resin 36 in a counter-flow direction thereby to fluff up the resin bed, and up outer pipe 40, through open valve 3A and out second outlet, or first drain 30. Backwash cycle 20 has the effect of fluffing up the beads of ion exchange resin 36, thereby to permit increased water flow through resin vessel 24. While not shown, it should also be appreciated that ion-exchange resin 36 may be further rinsed, if desired, by opening valves 3 and 5 so that city water 50 passes through inlet 22 and into resin vessel 24, up riser tube 38 and out second outlet, or first drain, 30.

Figure 7:
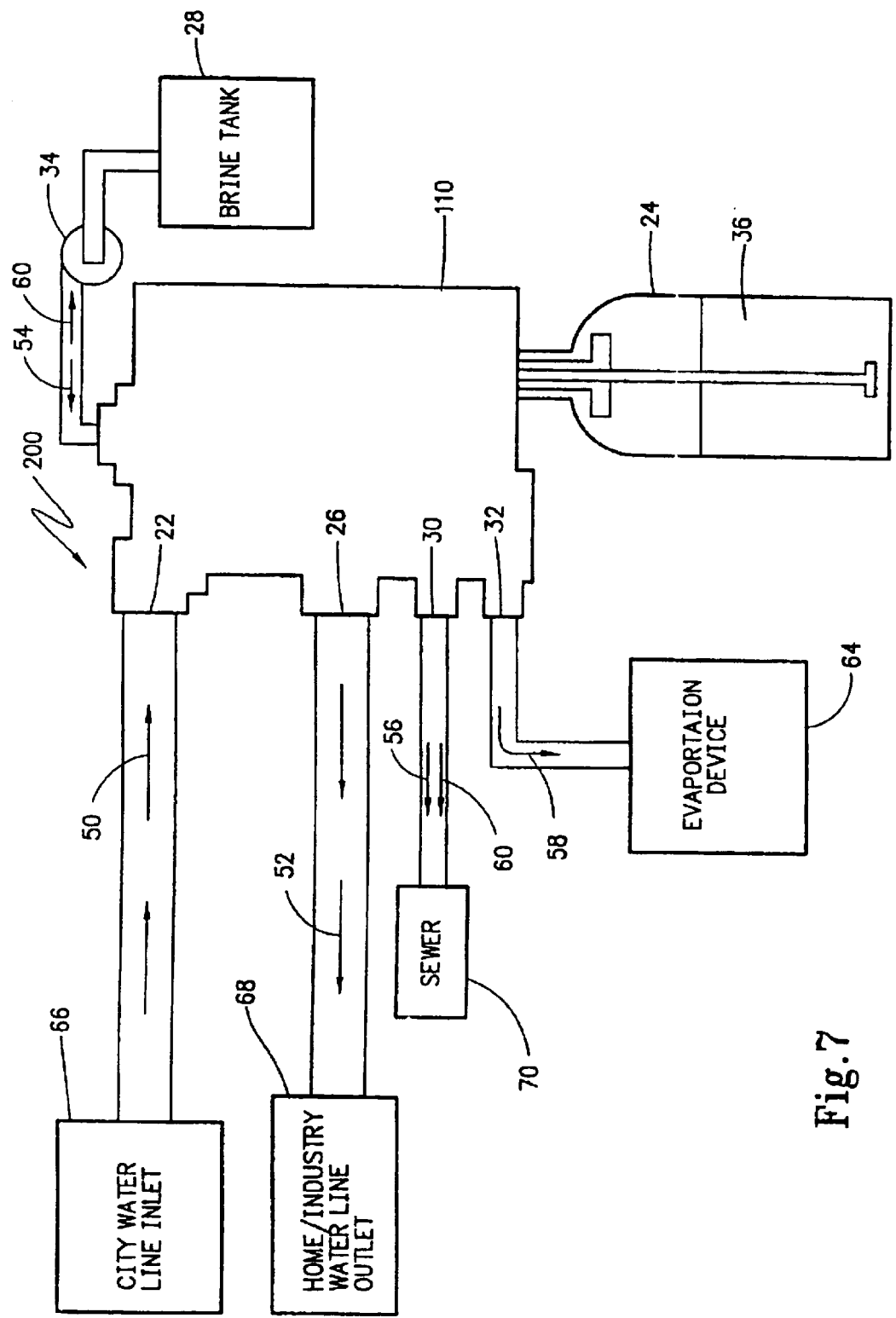
FIG. 7 is a diagrammatic view of the water softening system according to the present invention.

Turning to FIG. 7, it may be seen that water softening system 200 according to the present invention includes a manifold, such as multi-port valve 110; resin vessel 24 containing ion-exchange resin 36; regenerant reservoir, such as brine tank 28; a processing device, such as evaporation device 64; a water source, such as city water line inlet 66; a water tap, such as a home or industry water line outlet 68 that provides water for consumption, and a water drain, such as sewer 70. "Consumption" should be understood in the general sense of any use to which softened water 52 might be put. Pump 34 is disposed in fluid communication between brine tank 28 and manifold 110.

City water 50 is passed from the water source, such as the city water line inlet 66, to inlet 22 in manifold 110. Softened water 52 passes from first outlet 26 of manifold 100 to the home or industry water line outlet 68 where it can be used in residential and industrial processes, such as bathing, washing, drinking, etc. Clean water 56 and rinse water 60 may be sent to the sewer 70 through second outlet, or first drain 30, of manifold 110. Clean water 56 and rinse water 60 should contain little or no salt waste, and thus are acceptable solutions for municipal waste treatment systems. Waste solution 58 is passed through third outlet, or second drain 32, of manifold 110 to a processing device, such as evaporation device 64. Regenerant solution, such as brine 54 is pumped from brine tank 28 to manifold 110 by pump 34. Rinse water 60 flows from manifold 110 to brine tank 28 to allow replenishment of brine 54 in brine tank 28.

Evaporation device 64 preferably employs a heated environment operative to evaporate water from the waste solution 58, thereby to collect the dissolved salts in concentrated or solid form for proper disposal thereof. Given that standard evaporation of a $CaCl_2$ solution may be somewhat inefficient, the present invention contemplates supplemental treatments, such as adding NaOH to the waste water regenerant 58, thereby to precipitate $Ca(OH)_2$, and thereafter evaporating the resulting alkaline NaCl solution, which is more efficiently evaporated. Such supplemental steps, however, may present additional costs and/or safety concerns to the process, and therefore may not be desired for particular systems. It should be understood that alternative methods for collecting the salt waste may be employed, such as by filtration, chemical precipitation, etc.

Accordingly, the present invention has been described with some degree of particularity directed to the exemplary embodiment of the present invention. It should be appreciated, though, that modifications or changes may be made to the exemplary embodiment of the present invention without departing from the inventive concepts contained herein.

I claim:

1. A water softening apparatus adapted to be placed in fluid communication with a water drain, a processing device, a water source that provides water containing undesired ions, and a water tap that dispenses water for consumption, said water softening apparatus operative to remove the undesired ions from water processed thereby, comprising:
   (a) a resin vessel sized and adapted to receive a selected volume of a fluid, said resin vessel containing an ion-exchange resin that is capable of chemically shifting between an active state operative to exchange selected preferred ions therein for the undesired ions contained in the water when in contact therewith and an exhausted state operative to exchange the undesired ions therein for the selected preferred ions contained in a regenerant solution when in contact therewith;
   (b) a regenerant reservoir adapted to receive the regenerant solution containing the selected preferred ions; and
   (c) a manifold in fluid communication with said resin vessel and said regenerant reservoir, said manifold having a first inlet in fluid communication with the water source, a first outlet in fluid communication with the water tap, a second outlet in fluid communication with the water drain, and a third outlet in fluid communication with the processing device, said manifold including a plurality of fluid pathways communicating between said inlet, said outlets, said resin vessel and said regenerant reservoir, and a plurality of valves associated with said fluid pathways that are configurable into a plurality of valve states whereby in a first valve state fluid can flow through said first inlet, through said resin vessel and through said first outlet, whereby in a second valve state fluid can flow from said regenerant reservoir through said resin vessel and through said second outlet, whereby in a third valve state fluid can flow from said regenerant reservoir through said resin vessel and through said third outlet, and whereby in a fourth valve state fluid can flow through said first inlet, through said resin vessel and into said regenerant reservoir.

2. A water softening apparatus according to claim 1 wherein said valves are further configurable into a fifth valve state whereby fluid can flow through said first inlet, through said resin vessel and through said second outlet.

3. A water softening apparatus according to claim 1 including a pump in fluid communication with said regenerant reservoir and said manifold and operative to pump regenerant solution from said regenerant reservoir to said manifold.

4. A water softening apparatus according to claim 3 including a flow controller in fluid communication with said regenerant reservoir and said manifold and operative to control a flow rate of the regenerant solution from said regenerant reservoir.

5. A water softening apparatus according to claim 1 wherein said resin vessel includes a first combination inlet/outlet in fluid communication with said first inlet of said manifold and a second combination inlet/outlet in fluid communication with said first outlet of said manifold.

6. A water softening apparatus according to claim 5 wherein said resin vessel includes a resin vessel outlet in fluid communication with said second outlet of said manifold.

7. A water softening apparatus according to claim 5 wherein said first combination inlet/outlet is further in fluid communication with said third outlet of said manifold.

8. A water softening apparatus according to claim 5 wherein said second combination inlet/outlet is further in fluid communication with said regenerant reservoir.

9. A water softening apparatus according to claim 5 wherein said manifold includes a third combination inlet/outlet in fluid communication with said regenerant reservoir.

10. A water softening apparatus according to claim 1 wherein said ion-exchange resin is a shallow shell/shortened diffusion path resin.

11. A water softening apparatus according to claim 1 wherein said ion-exchange resin is a fine mesh resin having a bead diameter of approximately 16–70 mesh.

12. A water softening system, comprising:
   (a) a water source that provides water containing undesired ions;
   (b) a water tap that dispenses water for consumption;
   (c) a water drain;
   (d) a processing device;
   (e) a regenerant reservoir that is sized and adapted to receive a selected volume of a regenerant solution containing selected preferred ions;
   (f) a resin vessel sized and adapted to receive a selected volume of a fluid;
   (g) an ion-exchange resin disposed in said resin vessel, said ion-exchange resin capable of chemically shifting between an active state operative to exchange the selected preferred ions therein for the undesired ions contained in the water when in contact therewith and an exhausted state operative to exchange the undesired ions therein for the selected preferred ions contained in the regenerant solution when in contact therewith; and (h) a manifold in fluid communication with said resin vessel and said regenerant reservoir, said manifold having a first inlet in fluid communication with said water source, a first outlet in fluid communication with said water tap, a second outlet in fluid communication with said water drain, and a third outlet in fluid communication with said processing device, said manifold including a plurality of fluid pathways communicating between said inlet, said outlets, said resin vessel and said regenerant reservoir, and a plurality of valves associated with said fluid pathways that are configurable into a plurality of valve states whereby in a first valve state water from said water source flows through said first inlet, through said resin vessel and through said first outlet to said water tap when said ion-exchange resin is in the active state thereby to remove the undesired ions from the water, whereby in a second valve state regenerant solution flows from said regenerant reservoir into said resin vessel and water flows from said resin vessel through said second outlet to said water drain, whereby in a third valve state regenerant solution flows from said regenerant reservoir into said resin vessel when said ion-exchange resin is shifted toward the exhausted state thereby to shift the ion-exchange resin toward the active state and form a waste solution that flows through said third outlet to said processing device, and whereby in a fourth valve state water from said water source flows through said first inlet, through said resin vessel and into said regenerant reservoir thereby to replenish the volume of fluid therein.

13. A water softening system according to claim 12 wherein the undesired ions are calcium and magnesium ions.

14. A water softening system according to claim 12 wherein said processing device is an evaporation device.

15. A water softening system according to claim 12 wherein the regenerant solution is a brine solution.

16. A water softening system according to claim 12 wherein said valves are further configurable into a fifth valve state whereby water from said water source flows through said first inlet, through said resin vessel and through said second outlet to said water drain.

17. A method for softening water that contains undesired ions, comprising:

(a) providing an ion-exchange resin in a resin vessel sized and adapted to receive a fluid, wherein said ion-exchange resin is capable of chemically shifting between an active state operative to exchange selected preferred ions therein for the undesired ions contained in the water when in contact therewith and an exhausted state operative to exchange the undesired ions therein for the selected preferred ions contained in a regenerant solution when in contact therewith;

(b) contacting said ion-exchange resin with the water that contains the undesired ions when said ion-exchange resin is shifted toward the active state, thereby to remove the undesired ions from the water and shift said ion-exchange resin toward the exhausted state;

(c) contacting said ion-exchange resin with the regenerant solution containing the selected preferred ions when said ion-exchange resin is shifted toward the exhausted state, thereby to remove the preferred ions from the regenerant solution so as to shift said ion-exchange resin toward the active state;

(d) forming a waste solution containing the undesired ions;

(e) displacing a selected volume of water in said resin vessel with said regenerate solution and passing the selected volume of water to a water drain;

(f) disposing the waste solution containing the undesired ions via a processing device that is separate from a drainage line; and (g) rinsing said ion-exchange resin with water thereby to form a rinse solution and thereafter transporting the rinse solution to a regenerant reservoir.

18. A method according to claim 17 wherein the step of disposing said waste solution is accomplished by displacing said waste solution in said resin vessel with the regenerant solution and passing said waste solution to said processing device.

19. A method according to claim 18 including the step of displacing said regenerant solution in said resin vessel with water and passing to a regenerant reservoir a volume equal to the amount of regenerant solution used in the regeneration cycle.

20. A method according to claim 17 wherein the step of contacting said ion-exchange resin with the regenerant solution includes contacting said ion-exchange resin with between 0.25 and 2.0 bed volumes of the regenerant solution.

21. A method according to claim 17 wherein the step of contacting said ion-exchange resin with the regenerant solution includes transporting the regenerant solution from a regenerant reservoir into said resin vessel.

22. A method according to claim 21 wherein the regenerant solution is transported by pumping the regenerant solution from the regenerant reservoir into said resin vessel.

23. A method according to claim 17 wherein the step of disposing said waste solution includes transporting said waste solution to an evaporation device.

24. A method according to claim 17 including the step of adding rock salt to said regenerant reservoir, thereby to form a brine solution from said rinse solution.

25. A method for softening hard water using a water softening apparatus that includes an ion-exchange resin disposed in a resin vessel that is sized and adapted to receive a selected volume of a fluid, wherein said ion-exchange resin is one that is operative to soften hard water, the method comprising:

(a) displacing a quantity of water in said resin vessel with a regenerant solution, wherein said regenerant solution is operative to regenerate said ion-exchange resin when said ion-exchange resin is exhausted and thereby form in said resin vessel a waste solution having salt contaminants therein;

(b) transporting said displaced water to a water drain adapted to receive water for disposal;

(c) displacing a quantity of waste solution in said resin vessel with said regenerant solution thereby to fill said resin vessel with said regenerant solution;

(d) transporting said displaced waste solution to a processing device operative to process a solution having salt contaminants therein;

(e) displacing a quantity of regenerant solution in said resin vessel with water thereby to rinse said ion-exchange resin and form a rinse solution in said resin vessel;

(f) transporting said displaced regenerant solution to a regenerant reservoir adapted to receive said regenerant solution;

(g) displacing a quantity of rinse solution in said resin vessel with water;

(h) transporting said displaced rinse solution to at least one of said regenerant reservoir and said water drain;

(i) flowing hard water through said resin vessel thereby to contact said hard water with said ion-exchange resin to form softened water; and (j) transporting said softened water to a water tap operative to dispense said softened water for consumption.

26. A water softening apparatus adapted to be placed in fluid communication with a water drain, a processing device, a water source that provides water containing undesired ions, and a water tap that dispenses water for consumption, said water softening apparatus operative to remove the undesired ions from water processed thereby, comprising:

(a) a resin vessel sized and adapted to receive a selected volume of a fluid, said resin vessel having an upper portion and a lower portion, said lower portion containing a selected amount of an ion-exchange resin;

(b) a regenerant reservoir adapted to receive a selected volume of a fluid; and (c) a manifold in fluid communication with said resin vessel and said regenerant reservoir, said manifold having:

(1) a first inlet adapted to be placed in fluid communication with the water source;

(2) a first outlet adapted to be placed in fluid communication with the water tap;

(3) a second outlet adapted to be placed in fluid communication with the water drain;

(4) a third outlet adapted to be placed in fluid communication with the processing device;

(5) a first conduit fluidly communicating between said first inlet, said third outlet, and said upper portion of said resin vessel;

(6) a second conduit separate from said first conduit and fluidly communicating between said second outlet and said upper portion of said resin vessel;

(7) a third conduit separate from said first and second conduits and fluidly communicating between said first outlet, said second outlet, said regenerant reservoir and said lower portion of said resin vessel;

(8) a plurality of valves disposed in said conduits, wherein said valves are configurable into a plurality of valve states (A) whereby in a first valve state fluid can flow from said first inlet, through said first conduit into said upper portion of said resin vessel, through said ion-exchange resin in said lower portion of said resin vessel in a downflow direction, into said third conduit and out said first outlet;

(B) whereby in a second valve state fluid can flow from said regenerant reservoir, through said third conduit into said lower portion of said resin vessel, through said ion-exchange resin in said lower portion of said resin vessel in an upflow direction, through said second conduit and out said second outlet;

(C) whereby in a third valve state fluid can flow from said regenerant reservoir, through said third conduit into said lower portion of said resin vessel, through said ion-exchange resin in said lower portion of said resin vessel in an upflow direction, through said first conduit and out said third outlet; and (D) whereby in a fourth valve state fluid can flow from said first inlet, through said first conduit into said upper portion of said resin vessel, through said ion-exchange resin in said lower portion of said resin vessel in a downflow direction, through said third conduit and into said regenerant reservoir.

27. A water softening apparatus adapted to be placed in fluid communication with a water drain, a processing device, a water source that provides water containing undesired ions, and a water tap that dispenses water for consumption, said water softening apparatus operative to remove the undesired ions from water processed thereby, comprising:

(a) a resin vessel sized and adapted to receive a selected volume of a fluid, said resin vessel having an upper portion and a lower portion, said lower portion containing a selected amount of an ion-exchange resin, wherein said resin vessel includes a mouth in said upper portion of said resin vessel, a first tube extending through said mouth and opening into said lower portion of said resin vessel, and a second tube extending through said mouth and opening into said upper portion of said resin vessel;

(b) a regenerant reservoir adapted to receive a selected volume of a fluid; and (c) a manifold in fluid communication with said resin vessel and said regenerant reservoir, said manifold having:

(1) a first inlet adapted to be placed in fluid communication with the water source;

(2) a first outlet adapted to be placed in fluid communication with the water tap;

(3) a second outlet adapted to be placed in fluid communication with the water drain;

(4) a third outlet adapted to be placed in fluid communication with the processing device;

(5) a first conduit fluidly communicating between said first inlet, said third outlet, and said mouth of said resin vessel;

(6) a second conduit separate from said first conduit and fluidly communicating between said second outlet and said second tube of said resin vessel;

(7) a third conduit separate from said first and second conduits and fluidly communicating between said first outlet, said second outlet, said regenerant reservoir and said first tube of said resin vessel;

(8) a plurality of valves disposed in said conduits, wherein said valves are configurable into a plurality of valve states (A) whereby in a first valve state fluid can flow from said first inlet, through said first conduit and through said mouth into said upper portion of said resin vessel, through said ion-exchange resin in said lower portion of said resin vessel in a downflow direction, through said first tube and into said third conduit and out said first outlet;

(B) whereby in a second valve state fluid can flow from said regenerant reservoir, through said third conduit and through said first tube into said lower portion of said resin vessel, through said ion-exchange resin in said lower portion of said resin vessel in an upflow direction, through said second tube and into said second conduit and out said second outlet;

(C) whereby in a third valve state fluid can flow from said regenerant reservoir, through said third conduit and through said first tube into said lower portion of said resin vessel, through said ion-exchange resin in said lower portion of said resin vessel in an upflow direction, through said mouth and into said first conduit and out said third outlet; and (D) whereby in a fourth valve state fluid can flow from said first inlet, through said first conduit and through said mouth into said upper portion of said resin vessel, through said ion-exchange resin in said lower portion of said resin vessel in a downflow direction, through said first tube and through said third conduit and into said regenerant reservoir.

28. A water softening apparatus according to claim 27 wherein said first and second tubes and said mouth are concentric.

29. A method for softening water that contains undesired ions, comprising:

(a) providing an ion-exchange resin in a resin vessel sized and adapted to receive a fluid, wherein said ion-exchange resin is capable of chemically shifting between an active state operative to exchange selected preferred ions therein for the undesired ions contained in the water when in contact therewith and an exhausted state operative to exchange the undesired ions therein for the selected preferred ions contained in a regenerant solution when in contact therewith;

(b) contacting said ion-exchange resin with the water that contains the undesired ions when said ion-exchange resin is shifted toward the active state, thereby to remove the undesired ions from the water and shift said ion-exchange resin toward the exhausted state;

(c) contacting said ion-exchange resin with the regenerant solution containing the selected preferred ions when said ion-exchange resin is shifted toward the exhausted state, thereby to remove the preferred ions from the regenerant solution so as to shift said ion-exchange resin toward the active state;

(d) forming a waste solution containing the undesired ions;

(e) displacing a selected volume of water in said resin vessel with said regenerant solution and passing the selected volume of water to a water drain;

(f) disposing the waste solution containing the undesired ions via a processing device that is separate from a drainage line;

(g) displacing the regenerant solution in said resin vessel with water thereby to rinse said ion-exchange resin and form a rinse solution in said resin vessel;

(h) transporting said rinse solution to a regenerant reservoir; and (i) adding rock salt to said regenerant reservoir, thereby to form a brine solution from said rinse solution.

* * * * *